United States Patent
Cobb et al.

(10) Patent No.: US 8,126,833 B2
(45) Date of Patent: Feb. 28, 2012

(54) DETECTING ANOMALOUS EVENTS USING A LONG-TERM MEMORY IN A VIDEO ANALYSIS SYSTEM

(75) Inventors: Wesley Kenneth Cobb, The Woodlands, TX (US); Ming-Jung Seow, Houston, TX (US); Gang Xu, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 682 days.

(21) Appl. No.: 12/336,354

(22) Filed: Dec. 16, 2008

(65) Prior Publication Data

US 2010/0061624 A1  Mar. 11, 2010

Related U.S. Application Data

(63) Continuation-in-part of application No. 12/208,551, filed on Sep. 11, 2008.

(51) Int. Cl.
 *G06F 17/00* (2006.01)
 *G06F 15/18* (2006.01)
 *G06N 5/02* (2006.01)
 *G06K 9/62* (2006.01)
 *G06K 9/46* (2006.01)
 *G06K 9/66* (2006.01)

(52) U.S. Cl. ............ 706/46; 706/12; 382/155; 382/192; 382/227

(58) Field of Classification Search .................. None
See application file for complete search history.

(56) References Cited

U.S. PATENT DOCUMENTS

| | | | |
|---|---|---|---|
| 6,909,745 B1 | 6/2005 | Puri et al. | |
| 6,985,890 B2 * | 1/2006 | Inokuchi | 706/46 |
| 7,068,842 B2 | 6/2006 | Liang et al. | |
| 2003/0206717 A1 | 11/2003 | Yogeshwar et al. | |
| 2004/0268380 A1 | 12/2004 | Divakaran et al. | |

(Continued)

FOREIGN PATENT DOCUMENTS

JP    2007272768    10/2007

(Continued)

OTHER PUBLICATIONS

Bradski, Gary et al.; "STORE working memory networks for storage and recall of arbitrary temporal sequences"; 1994; Biological Cybernetics 71; pp. 469-480.*

(Continued)

*Primary Examiner* — Jeffrey A Gaffin
*Assistant Examiner* — Stanley K Hill
(74) *Attorney, Agent, or Firm* — Patterson & Sheridan, LLP

(57) ABSTRACT

Techniques are described for detecting anomalous events using a long-term memory in a video analysis system. The long-term memory may be used to store and retrieve information learned while a video analysis system observes a stream of video frames depicting a given scene. Further, the long-term memory may be configured to detect the occurrence of anomalous events, relative to observations of other events that have occurred in the scene over time. A distance measure may used to determine a distance between an active percept (encoding an observed event depicted in the stream of video frames) and a retrieved percept (encoding a memory of previously observed events in the long-term memory). If the distance exceeds a specified threshold, the long-term memory may publish the occurrence of an anomalous event for review by users of the system.

25 Claims, 11 Drawing Sheets

U.S. PATENT DOCUMENTS

| | | | |
|---|---|---|---|
| 2007/0179760 A1* | 8/2007 | Smith | 703/2 |
| 2008/0193010 A1 | 8/2008 | Eaton et al. | |
| 2008/0247599 A1 | 10/2008 | Porikli et al. | |
| 2009/0324107 A1* | 12/2009 | Walch | 382/224 |
| 2010/0063949 A1 | 3/2010 | Eaton et al. | |

FOREIGN PATENT DOCUMENTS

| | | |
|---|---|---|
| KR | 1020080018642 A | 2/2008 |

OTHER PUBLICATIONS

Search Report and Written Opinion for U.S. Appl. No. PCT/US2009/068308 dated Jul. 21, 2010.

PCT International Search Report for PCT/US2009/056561, dated Mar. 25, 2010.

Chris Stauffer et al., "Adaptive Background Mixture Models for Real-Time Tracking," IEEE Computer Society Conference on Computer Vision and Pattern Recognition, Jun. 1999, vol. 2: pp. 1-7.

Andrew Senior et al., "Appearance Models for Occlusion Handling," 2nd IEEE Workshop on Performance Evaluation of Tracking and Surveillance, 2001: pp. 1-8.

Chris Stauffer et al., "Learning Patterns of Activity Using Real-Time Tracking," IEEE Transactions on Pattern Analysis and Machine Intelligence, Aug. 2000, vol. 22(8): pp. 747-757.

S. Apewokin et al., "Multimodal Mean Adaptive Backgrounding for Embedded Real-Time Video Surveillance," IEEE Conference on Computer Vision and Pattern Recognition, Jun. 2007: pp. 1-6.

Ahmed Elgammal et al. "Non-parametric Model for Background Substraction," ECCV 6th European Conference on Computer Vision, 2000: pp. 751-767.

Pentti Kanerva, "Sparse Distributed Memory and Related Models," M.H. Hassoun, ed., Associative Neural Memories: Theory and Implementation, 1993, New York, Oxford University Press: pp. 1-41.

Ismail Haritaoglu et al., "W4: Real-Time Surveillance of People and Their Activities," IEEE Transactions on Pattern Analysis and Machine Intelligence, Aug. 2000, vol. 22(8): pp. 809-830.

Yuri Ivanov et al., "Video Surveillance of Interactions," CVPR Workshop on Visual Surveillance, 1998 Fort Collins: pp. 82-89.

* cited by examiner

DETECTING ANOMALOUS EVENTS USING A LONG-TERM MEMORY IN A VIDEO ANALYSIS SYSTEM

CROSS REFERENCE TO RELATED APPLICATIONS

This application is a continuation-in-part of commonly assigned, co-pending U.S. patent application Ser. No. 12/208,551 filed Sep. 11, 2008, entitled "Long-Term Memory in a Video Analysis System", which is herein incorporated by reference in its entirety. This application also relates to commonly assigned, co-pending U.S. patent application Ser. No.12/028,484 filed Feb. 8, 2008, entitled "Behavioral Recognition System", which is herein incorporated by reference in its entirety.

BACKGROUND OF THE INVENTION

1. Field of the Invention

Embodiments of the invention relate to techniques for programmatically associating, learning, and recalling patterns of behavior depicted in a sequence of video frames. More specifically, embodiments of the invention provide a video analysis system that includes a long-term memory used to detect the occurrence of anomalous events.

2. Description of the Related Art

Some currently available video surveillance systems provide simple object recognition capabilities. For example, a video surveillance system may be configured to classify a group of pixels in a given frame having certain specified characteristics (referred to as a "blob") as being a particular object (e.g., a person or vehicle). Once identified, a "blob" may be tracked from frame-to-frame in order to follow the movement of the "blob" over time, e.g., a person walking across the field of vision of a video surveillance camera. Further, such systems may be able to determine when an object has engaged in certain predefined behaviors.

However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system is generally incapable of recognizing that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. For example, monitoring airport entrances for lurking criminals and identifying swimmers who are not moving in a pool are two distinct situations, and therefore may require developing two distinct software products having their respective "abnormal" behaviors pre-coded. Thus, currently available video surveillance systems are typically incapable of recognizing new patterns of behavior that may emerge in a given scene or recognizing changes in existing patterns. Further, such systems are often unable to associate related aspects from different patterns of observed behavior, e.g., to learn to identify behavior being repeatedly performed by a criminal prior to breaking into cars parked in a parking lot.

Further, the static patterns that available video surveillance systems are able to recognize are frequently either under inclusive (i.e., the pattern is too specific to recognize many instances of a given object or behavior) or over inclusive (i.e., the pattern is general enough to trigger many false positives). In some cases, the sensitivity of may be adjusted to help improve the recognition process, however, this approach fundamentally relies on the ability of the system to recognize predefined patterns for objects and behavior. As a result, by restricting the range of objects that a system may recognize using a predefined set of patterns, many available video surveillance systems have been of limited usefulness.

SUMMARY OF THE INVENTION

One embodiment of the invention includes a computer-implemented method for detecting anomalous events using a long-term memory in a video analysis system configured to observe patterns of behavior depicted in a sequence of video frames. The method may generally include receiving an active percept. The active percept may provide a sub-graph of a neural network excited by a semantic symbol stream, and the semantic symbol stream may describe objects depicted in the sequence of video frames. The method may also include querying the long-term memory using the active percept as an input stimulus, and receiving, in response to the querying, both a retrieved percept from the long-term memory and an occurrence frequency (F) of the retrieved percept. The retrieved percept encodes a pattern of behavior previously observed by the video analysis system. The method may also include determining a distance (d) between the active percept and the retrieved percept. Upon determining the distance (d) exceeds a specified threshold, an alert notification may be published indicating the occurrence of an anomalous event, as represented by the active percept.

In a particular embodiment, prior to querying the long-term memory, an episodic memory may also be queried using the active percept as an input stimulus. The episodic memory may store percepts encoding instance specific details regarding events observed to have occurred in the sequence of video frames. If any percepts are retrieved from the episodic memory, such percepts may be stored in the long-term memory.

In one embodiment, the distance d may be defined by:

$$d=1-[\alpha S+(1-\alpha)F]$$

where S is a cosine similarity determined between the active percept and the retrieved percept, wherein F is the occurrence frequency of the retrieved percept in the long-term memory, and $\alpha$ is a heuristic weighting coefficient between 0 and 1.

Alternatively, the distance d may be defined by:

$$d=1-(S\sqrt{F}-\sqrt{1-S^2}\sqrt{1-F})^2$$

where S is a cosine similarity determined between the active percept and the retrieved percept, and F is the occurrence frequency of the retrieved percept in the long-term memory.

Alternatively still, the distance d may be defined by:

$$d = 1 - \left[\frac{2}{1 + e^{-\frac{S}{1-\sqrt{F}}}} - 1\right]$$

where $$\left[\frac{2}{1+e^{-\frac{S}{1-\sqrt{F}}}} - 1\right]$$

is a sigmoid curve and $$-\frac{S}{1-\sqrt{F}}$$

is the slop function to control the curvature of the distance measure function. Like above, S is a cosine similarity determined between the active percept and the retrieved percept, and F is the occurrence frequency of the retrieved percept in the long-term memory.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings. Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
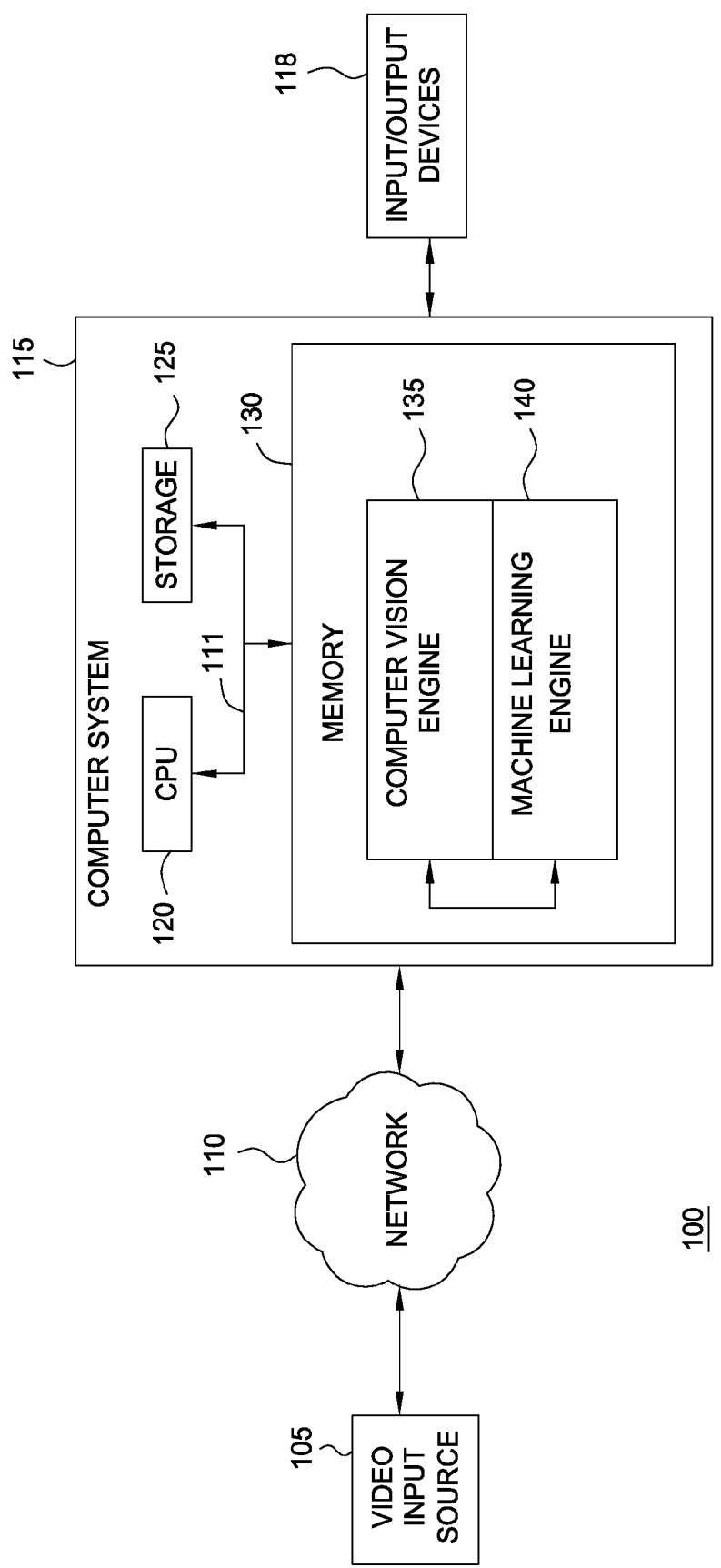
FIG. 1 illustrates components of a video analysis and behavior-recognition system, according to one embodiment of the present invention.

Embodiments of the invention provide a long-term memory used to store and retrieve information learned while a video analysis system observes a stream of video frames depicting a given scene. Further, the long-term memory may be configured to detect the occurrence of anomalous events, relative to observations of other events that have occurred in the scene over time. The long-term memory may publish the occurrence of an anomalous event for review by users of the system.

Generally, the video analysis system may include a computer vision engine and a machine learning engine. The computer vision engine may be configured to receive and process video frames captured by a video input source (e.g., a video camera). Output from the computer vision engine may include image data from frames of video along with a semantic labeling of such data. That is, the output of the computer vision engine may provide a symbol stream representing a basic linguistic grammar representing what is "seen" by the computer vision engine from frame-to-frame. The machine learning engine may be configured to process the output of the computer vision engine. In one embodiment, the machine learning engine may use multiple data structures, referred to as memories, to store and process information related to what is observed and perceived to have occurred within the scene. As described in greater detail below, e.g., the machine learning engine may include a perceptual associative memory (PAM), an episodic memory (EM), and a long-term memory (LTM).

In one embodiment, the long-term memory is configured to store, encode, retrieve, and decode directed graphs, referred to herein percepts, representing observed patterns of behaviors. A percept itself may include a set of one or more semantic nodes connected by relational links. The most relevant behavior patterns that occur in a given scene are stored and, over time, generalized through reinforcement in the long-term memory.

Unlike prior-art methods of anomaly detection, which separate the learning process from the anomaly detection process, embodiments of the invention described herein combine the learning and detecting processes. Initially, the long-term memory begins by observing a scene and both learns and detects anomalous events. As the state of the long-term memory evolves, it continually improves its ability to identify and detect anomalous events, as well as improve the "knowledge" stored in the long-term memory. Thus, the system described herein may observe, learn, and analyze behavior patters observed in a scene in an autonomous manner.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 114 may transmit video data recorded by the video input source 105 to the computer system 115. Illustratively, the computer system 115 includes a CPU 120, storage 125 (e.g., a disk drive, optical disk drive, floppy disk drive, and the like), and a memory 130 containing a computer vision engine 135 and a machine learning engine 140. The computer vision engine 135 and the machine learning engine 140 may provide software applications configured to analyze a sequence of video frames provided by the video input 112.

Network 110 transmits video data (e.g., video stream(s), video images, or the like) from the video input source 105 to the video analysis and behavior-recognition system 100. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value. Further, the video stream may be formatted using known such formats e.g., MPEG2, MJPEG, MPEG4, H.263, H.264, and the like.

The computer vision engine 135 may be configured to analyze this raw information to identify objects in the video stream, classify the objects, derive a variety of numerical data regarding the actions and interactions of such objects. For example, assume a sequence of video frames depicts a car entering the scene, moving to a parking spot, and stopping. In such a case, the computer vision engine 135 may detect the appearance of an object, classify the object as being a vehicle, and track the object vehicle as it moves within the scene. For example, the output of the computer vision engine 135 may include numerical data indicating what portions of the scene (e.g., what pixels) depict the vehicle from frame-to-frame, an identifier for the vehicle (and other tracked objects in the scene), along with context-specific data such as an estimated position, velocity, or other kinematic data describing the vehicle (and other objects in the scene), as determined by components of the computer vision engine 135. In one embodiment, the numerical data output by the computer vision engine 135, along with frames of video (and images generated therefrom, e.g., a background image and masks of foreground objects), may be passed to the machine learning engine 140.

In turn, the machine learning engine 140 may be configured to evaluate, observe, learn and recognize patterns of behavior regarding events (and types of events) that transpire within the scene over time In one embodiment, the output from the computer vision engine 135 may be used to generate a semantic description of the scene. For example, a primitive event detector may be configured to evaluate the numerical data emitted by the computer vision engine 135 to identify patterns indicating a particular action or behavior has occurred. Returning to the example of a vehicle parking, the machine learning engine 140 may generate primitive events representing the actions of the vehicle, e.g., "vehicle appeared," "vehicle moves," "vehicle stops," "person appears proximate to vehicle," "person starts moving," and "person disappears" using the numerical data supplied by the computer vision engine 135 to the machine learning engine 140.

As stated, the machine learning engine 140 receives the video frames and the symbol stream generated by the computer vision engine 135. The machine learning engine 140 may be configured to analyze the received data, detect patterns, and, ultimately, to learn from these observed patterns to identify normal and/or abnormal events. In one embodiment, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 each process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 150 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 135 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application running on another computer system may request (or receive) the results of over network 110.

Figure 2:
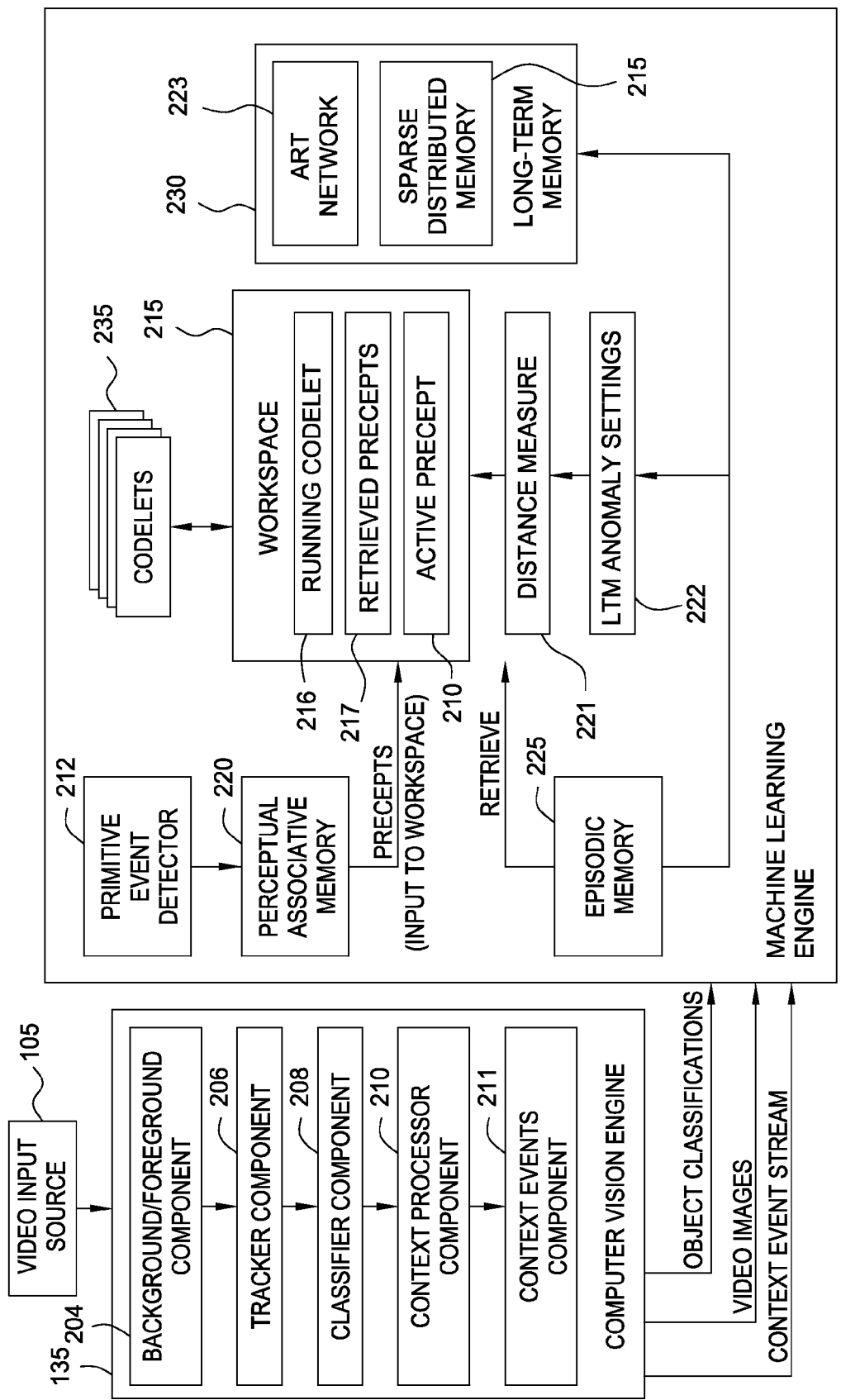
FIG. 2 further illustrates components of a computer vision engine and a machine learning engine first illustrated in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground component 204 (BG/FG component), a tracker component 206, a classifier competent 108, a context processor component 210, and a context events component 211. In one embodiment, the components of the computer vision engine 135 generate a variety of contextual and kinematic data related to the scene depicted in a sequence of video frames and supply this information to the machine learning engine 140. For example, the BG/FG component 204 may, over a sequence of frames, develop a background/foreground model of the scene indicating which elements of a given frame depict scene background and which elements depict foreground objects. That is, the BG/FG component 204 may be configured to separate the frames of video into a stationary part (the "background") and a collection of volatile parts (the "foreground patches") for subsequent use by other components of the computer vision engine 135.

The tracker component 206 may be configured to receive the foreground patches identified by the BG/FG component 204, build an appearance based model regarding the patches, and attempt to track the motion of the objects depicted by the patch as they move about the scene. In one embodiment, the appearance model may characterize the appearance of a given object as it moves from frame-to-frame, and the tracker component 206 may use the appearance model of an object generated for an object depicted in the foreground of frame N to identify that object in frame N+1.

The classifier component 208 may be configured to receive the output of the tracker component 206 (i.e., the models and positions of objects active within the scene) and attempt to classify the corresponding subjects as depicting one of one or more known categories of objects, based on the features or characteristics of a given object. For example, the classifier component 208 may receive the pixels determined to depict the foreground object along with other data related to its kinematics, pose, position, etc. From this information, the classifier component 208 may classify the object as depicting, e.g., a car or a person, or something else, depending on the capabilities of the classifier. For example, in one embodiment, the classifier component 208 may be configured to classify an object as being a vehicle, a person, an unknown, or an other. Note, in this context, an "other" refers to an object classified by the classifier component 208 as affirmatively not being either a vehicle or a person. If the classifier component 208 is able to identify a given object as depicting a person or a vehicle, the classifier component 208 may also estimate a pose for that object (i.e., an orientation or posture), location and motion as well.

Further, in one embodiment, the context processor component 210 may be configured to identify regions of the background image and derive information about each region, e.g., whether one region is in front of (or behind) another.

The context events component 211 may be configured to generate kinematic data describing motions and actions of tracked objects in the scene. For example, an object classified as being a vehicle may be characterized as following a trajectory, having a estimated velocity, and occupying specific regions of the scene. Similarly an object classified as being a person may be characterized as moving or stopped, and if moving, having a particular direction and velocity. An object classified as being a person may also be characterized as having a particular pose, e.g., standing, sitting, lying down, etc.

In one embodiment, the output of the computer vision engine 135 (as shown in FIG. 2, the object classifications, video images and the context event stream) is supplied to the machine learning engine 140. As shown, the machine learning engine 140 includes a primitive event detector 212, a workspace 215, a perceptual memory 220, an episodic memory 225, a long-term memory 230, and codelets 235. The primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context events component 211 estimates the kinematic data regarding the cars position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle" "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 220.

Figure 7A:
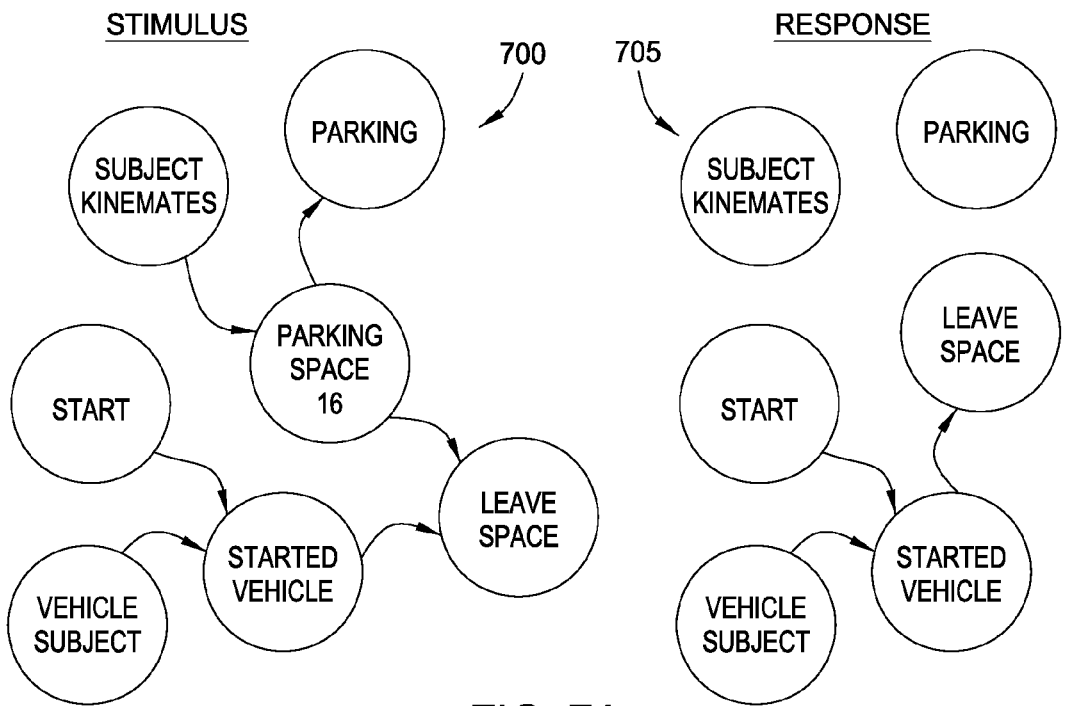
FIGS. 7A-7B illustrate examples of input percepts used to activate elements of a long-term memory as well as percepts returned in response, according to one embodiment of the invention.
Figure 7B:
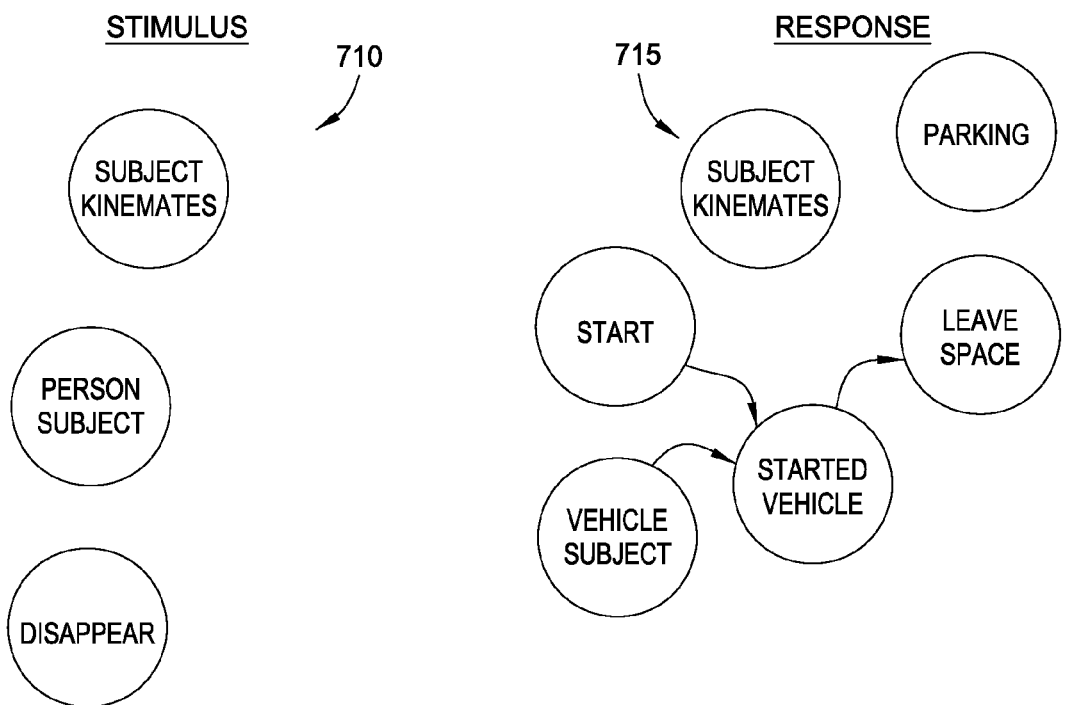

In one embodiment, the perceptual memory 220, the episodic memory 225, and the long-term memory 230 are used to identify patterns of behavior, evaluate events that transpire in the scene, and encode and store observations related to such patterns of behavior. Illustratively, the perceptual associative memory 220 receives the output of the primitive event detector 212. The episodic memory 225 may store percepts encoding instance specific details regarding events observed to have occurred in the sequence of video frames. As stated, each percept may include a directed sub-graph of nodes representing things behaviors or events and relational links between nodes. (An example of percepts is shown in FIGS. 7A-7B.) The episodic memory 225 may encode and store percepts which include information describing time and space details related on an event observed to have occurred. That is, the episodic memory 225 may include details describing "what and where" something occurred within a scene, e.g., at 9:43 AM a particular car (car A) having a specified position and velocity moved to a specific region of the scene determined to depict a parking spot.

In one embodiment, the episodic memory 225 stores percepts obtained by exiting the perceptual associated memory 220 when such percepts are determined to be relevant to some particular event. For example, a "parking-detection" codelet 235 (a piece of executable code) may be configured to evaluate the output from stimulating the perceptual associative memory 220 to identify whether the scene depicts a "vehicle parking" event. In such a case, the codelet 235 may decide to store a percept representing the time and space details of the parking event in the episodic memory 225. Doing so allows such a "parking-detection" codelet 235 to compare and learn from multiple percepts, each representing a distinct parking event. Further, as described in greater detail below, percepts stored in the episodic memory 225 may be encoded and stored in the long term memory 230, as well as used to reinforce existing data in the long-term memory 230. Further, as described in greater detail below, one of the codelets 235 (referred to as an anomaly-detection codelet) may be configured to evaluate a percept obtained by stimulating the perceptual associative memory 220 against percepts encoded and stored in the long-term memory 230 to determine whether an anomalous event has occurred.

In one embodiment, the perceptual associative memory 220 may be implemented as a neural network. The perceptual associative memory 220 may be configured to receive a stream of primitive events from the primitive event detector 212 as well the underlying data from the computer vision engine 135 (e.g., video images, object classifications, appearance models, background/foreground models, etc.). Further, the stream of primitive events may be used to excite a group of nodes present in the neural network. The excited nodes provide a directed sub-graph of the neural network. As stated, sub-graph is generally referred to herein as a percept. More generally, the sub-graph represents what is perceived by the machine learning engine, relative to a given input stimulus.

A percept obtained by exciting the perceptual associative may be copied into the workspace 215 (illustrated in FIG. 2 as an input percept 218). When a percept is copied to the workspace 215, it may also be copied to the episodic memory 225. Further, the active percept 218 itself may be used to retrieve other percepts from the episodic memory 225 and the long-term memory 230 (illustrated in FIG. 2 as retrieved memories 217). Collectively, the active percept 218 and retrieved memories 217 may be analyzed to relate and understand a current event as well as to compare the current event to past experience. In one embodiment, the memories in the episodic memory 225 and long-term memory 230 are themselves represented as percepts. That is, the memories may be represented as directed graphs (or sub-graphs) similar to the neural network built-up as the perceptual memory 220 observes the information from the computer vision engine 135. Thus, each percept encodes information related to an observed event.

The long-term memory 230 may store data generalizing events observed in the scene. In one embodiment, the long-term memory may be implemented using a Adaptive Resonance Theory (ART) network 233 and a binary Sparse Distributed Memory (SDM) 235. To continue with the example of a car parking, the long-term memory 230 may encode precepts representing observations learned by an analysis of the behavior of objects in the scene. For example, percepts may encode patterns of behavior which may be described as "cars tend to park in a particular place," "when parking, cars tend to move a certain speed," and "after a car parks, people tend to appear in the scene," etc. Thus, the long-term memory 230 stores observations about what happens within a scene with much of the particular episodic details stripped away. When a new event occurs, memories from the episodic memory 225 and the long-term memory 230 may be used to relate and understand a current event, i.e., the new event may be compared with past experience, leading to both reinforcement, decay, and adjustments to the information stored in the long-term memory 230, over time. Further the long-term memory 140 may represent a summary of the visual events observed to have occurred in the scene. As such, a percept that the long-term memory cannot retrieve is generally considered a novel event, i.e., an anomaly. In other words, if a percept provided to the long-term memory as an input stimulus does not excite any response, then that percept encodes an event that has not been observed in the scene up to that point in time.

Generally, the workspace 215 provides a computational engine for the machine learning engine 140. For example, the workspace 215 may be configured to copy percepts from the perceptual memory 220 (i.e., to copy a sub-graph of a neural network that was excited by events observed by the computer vision engine 135), retrieve relevant memories from the episodic memory 225 and the long-term memory 230, select and invoke the execution of one of codelets 235 (illustrated as FIG. 2 as running codelet 216). In one embodiment, each codelet 235 is a software program configured to evaluate different sequences of events and to determine how one sequence may follow, precede, or otherwise relate to another. More generally, the codelet may provide a software program configured to find and/or evaluate patterns of behavior depicted in the sequence of video frames (and the semantic symbol stream describing what is depicted in the video frames). In turn, codelet 325 may create, reinforce, or modify memories in the episodic memory 225 and the long-term memory 230. By repeatedly scheduling codelets for execution, copying memories and percepts to/from the workspace 215, the machine learning engine 140 performs a cognitive cycle used to observe and learn patterns of behavior that occur within the scene.

One codelet 235 may be configured to evaluate an active percept 218 to determine whether an anomalous event has occurred (referred to as an anomaly-detection codelet). Generally, an anomalous event occurs when the event encoded as active percept 218 is sufficiently distinct from other events, relative to observations of other events that have previously occurred in the scene. More specifically, as described in greater detail below, an anomalous event occurs when the event encoded as active percept 218 has a distance value that exceeds a threshold specified in long-term anomaly settings 222. In one embodiment, the distance measure may be evaluated using a scale that allows the active percept to be classified using a scale indicating an increasing degree measure of anomalousness (e.g., grey, magenta, blue, green, yellow, orange, red). Another long-term anomaly settings 222 includes a value used to identify whether the long-term memory has reached a mature state. The distance value itself may be determined from the active percept 218, a distance measure 221, and a frequency of occurrence (F) for a percept retrieved from long-term memory 230. When the long-term memory 230 reaches a mature state, machine learning engine 140 may publish the occurrence of an anomalous event for review by a user of the system 100.

In one embodiment, the occurrence of an anomalous event may be detected using a three phase process. In a first phase, the anomaly-detection codelet may query the episodic memory 225 using the active percept 218 as an input stimulus. Any percepts retrieved are stored (or used to reinforce) the long-term memory 230. In a second phase, the anomaly-detection codelet may query the long-term memory 230 using the active percept 218 as an input stimulus. In response, the long-term memory 230 may provide a response in the form of a response percept along with the corresponding frequency of occurrence (F) of the response percept. Note, as illustrated below in FIGS. 4A-4B, the response percept may be retrieved in such a way that it is unique to all the percepts currently stored in the long-term memory. That is, two (or more) percepts in the long-term memory 230 may be combined to form a single response precept, triggered as a response to the input stimulus of active percept 218.

In a third phase, the active percept 218 and the frequency (F) may then be evaluated using the distance measure 221 to determine a distance between the active 218 percept and the percept retrieved from long-term memory 230. The greater the distance, the more distinct or different the observed behavior encoded by active percept 218 is from the retrieved percept. If the distance is above a specified threshold, the anomaly-detection codelet may conclude that an anomalous event has occurred and publish an alarm, ultimately presented to a user. Further, the distance between the input percept and a retrieved percept may provide a measure of severity of the alert—referred to as an anomaly temperature. That is, the "more" anomalous the occurrence of the observed behavior represented by the active percept 218, the greater the temperature assigned to that behavior.

More generally, the first phase allows the machine learning engine 140 to observe and learn what patterns of behavior (as represented by percepts) are "normal" for a given scene. During this phase, memories are created and stored. The second phase extracts the knowledge then present in the long-term memory that is most relevant to a given active percept 218. The third phase analyzes the input percept by computing a distance using distance measure 221 between the input percept and the retrieved percept to determine a measure of a measure of severity for anomalous events. The distance computed between a given active percept 218 and percept retrieved form long-term memory 230 may depend in part how often the retrieved percept is "seen" in the long-term memory. That is, the frequency of occurrence (F) is also used to analyze the severity of an anomaly.

As stated, the distance measure 221 may be used to analyze the anomaly degree of a given active percept 218. In one embodiment, the distance may be determined using the following equation as the distance measure 221:

$$d = 1 - [\alpha S + (1-\alpha) F] \quad \text{Distance measure—Equation 1}$$

Where S is the cosine similarity or dot-product determined between the active percept 218 and the retrieved percept. In such a case, the percepts may be configured to vectors. For example, as discussed below, percepts may be encoded as a matrix using a run-length encoding scheme. F provides a measure for an occurrence frequency of a given percept retrieved from the long-term memory 230. That is, F represents how often the event encoded by the retrieved percept has been previously observed to have occurred in the scene. As used in equation 1, α represents a heuristic weighting coefficient between 0 and 1. The value for α may be set as a matter of experience and the requirements of a particular case. Lower values of α tend to result in past events having greater influence in calculating whether a given precept represents the occurrence of an anomalous event. That is, α may be used to specify whether to put more weight on past experience (percepts in the long term memory) or present differences between the active and retrieved percepts. Equation 1 provides a heuristic distance measure that takes into account both the cosine similarity (S) and the frequency (F) of a given percept in the long-term memory.

Another example of the distance measure 221 includes the following equation:

$$d = 1 - (S\sqrt{F} - \sqrt{1-S^2}\sqrt{1-F})^2 \quad \text{Distance measure—Equation 2}$$

Where S is the cosine similarity or dot-product determined between the active percept 218 and the retrieved percept. Equation two determines a distance between the active percept 218 and the retrieved percept based upon the probability interpretation of the square of the cosine similarity (S). Equation 2 takes into account both the similarity (S) and the dissimilarity ($\sqrt{1-s^2}$) between the active percept 218 and the retrieved percept, as well as the statistical frequency (F) of the percept retrieved from the long-term memory 230.

Alternatively still, the distance d may be defined by:

$$d = 1 - \left[\frac{2}{1 + e^{-\frac{S}{1-\sqrt{F}}}} - 1\right]$$

where $$\left[\frac{2}{1 + e^{-\frac{S}{1-\sqrt{F}}}} - 1\right]$$

is a sigmoid curve and $$-\frac{S}{1-\sqrt{F}}$$

is a slope function used to control the curvature of the distance measure function. Like above, S is a cosine similarity or dot product determined between the active percept and the retrieved percept, and F is the occurrence frequency of the retrieved percept in the long-term memory. e is Euler's constant. Of course, one of ordinary skill in the art will recognize that other methods may be used to determine a distance between an active percept 218 and a percept retrieved from the long-term memory 230.

Figure 3A:
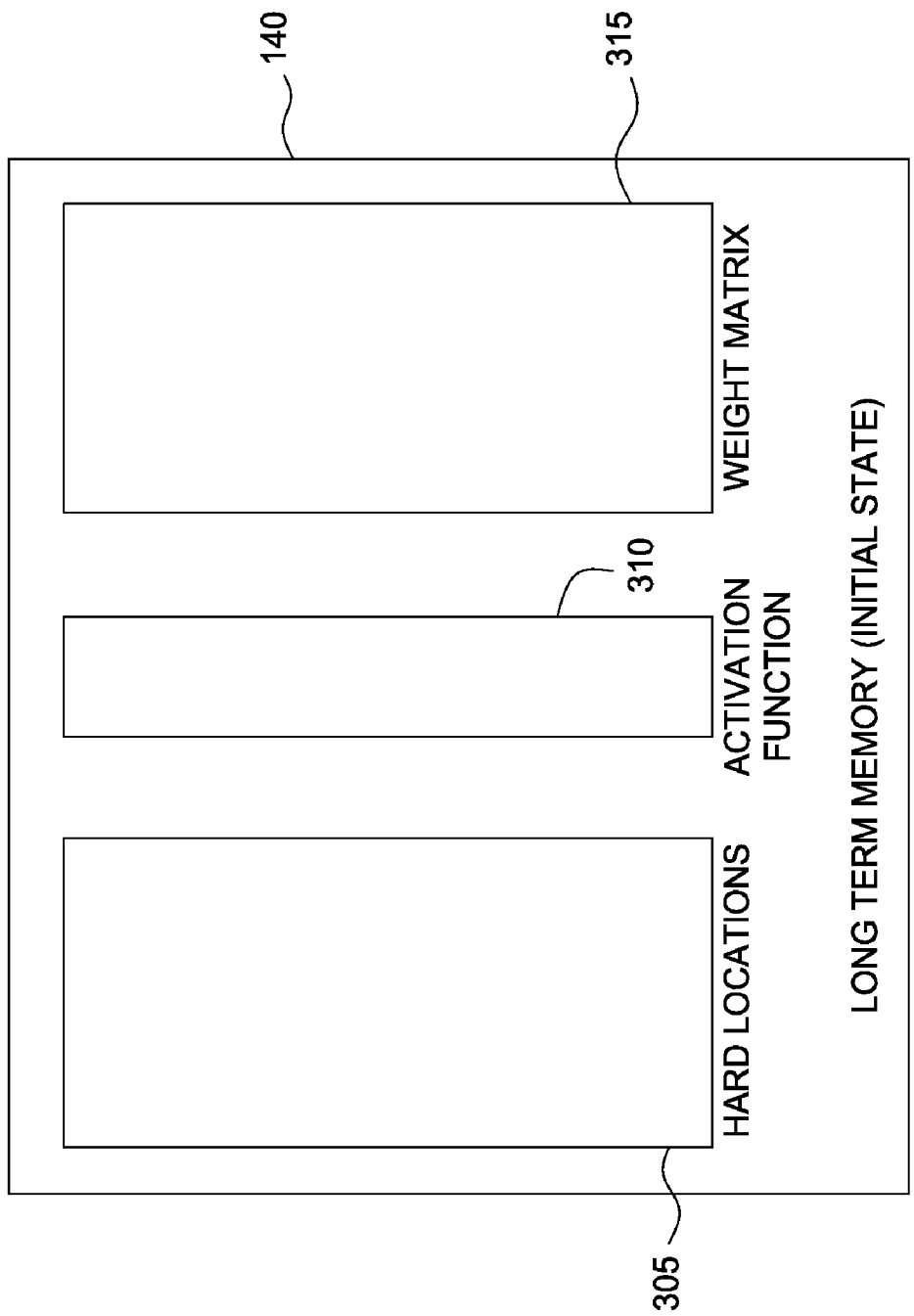
FIGS. 3A-3D illustrate a long-term memory used to create, store, reinforce, and modify memories represented as encoded percepts, according to one embodiment of the invention.

FIGS. 3A-3D illustrate a long-term memory 140 used to create, store, reinforce, and modify memories (represented as encoded percepts), according to one embodiment of the invention. First, FIG. 3A illustrates the initial state of a long-term memory 140. In a particular embodiment, the long-term memory is implemented as a sparse distributed memory data structure. As shown, the long-term memory 230 includes a null set of hard locations 305, an activation function 310, and a null weight matrix 140. As illustrated in greater detail below in conjunction with FIGS. 3B-3D the hard locations 305 store encoded patterns of percepts—sorted into different classes or categories. That is, each hard location 305 corresponds to a category of event with different variations (e.g., a car parking stopping starting etc.). In one embodiment, hard locations 305 may be implemented as an adaptive resonance theory (ART) network and ART network locations (i.e., hard locations 305) may be created and/or modified according to vigilance parameter and choice parameter. As memories (i.e., percepts) are selected to be stored in the long-term memory 140 (e.g., as a codelet operates on an excited percept), the hard locations 305 are used to determine whether to create a new memory in the long-term memory or to modify the weights in the weight matrix 140 associated with an existing hard location 305. Thus, the number of hard locations in the weight matrix 140 is dynamic. Over time, as the number of nodes and links increases, the horizontal size of the weight matrix 140 continues to grow. Similarly, as the number of distinct events is encoded into the long-term memory 230, the number of rows (i.e., the vertical size) of the weight matrix 140 continues to grow.

Figure 3B:
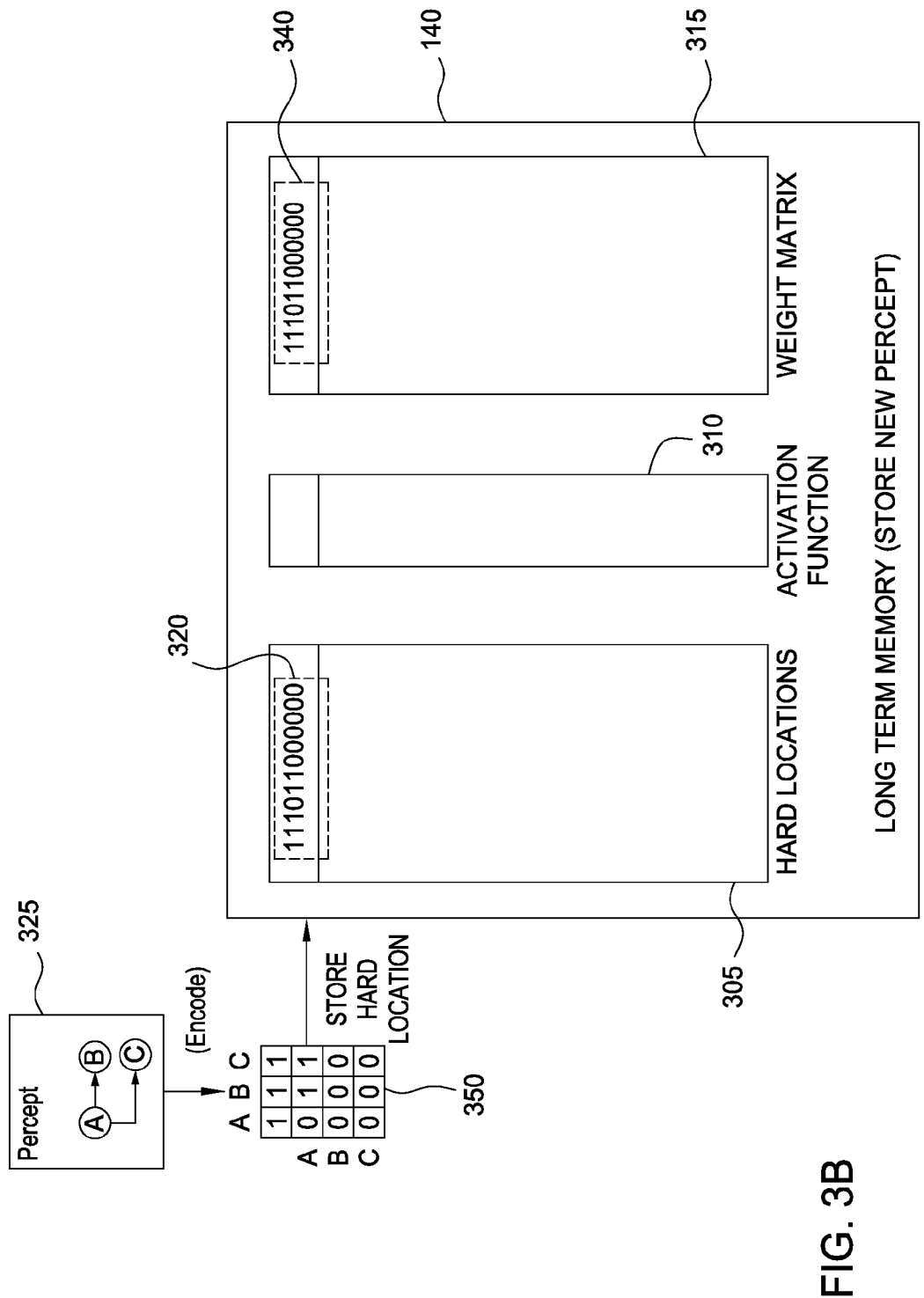

FIG. 3B illustrates an example of a new percept 325 being encoded and stored in long-term memory 140. As shown, the percept 325 includes a directed graph of three nodes, "A," "B," and "C," and edges from node "A" to both nodes "B" and "C." Assume for this example, that nodes "A," "B," and "C" form a percept related to a parking event observed in the scene and that these nodes were excited in the perceptual memory 220 by input from the computer vision engine 135. In such a case, the percept 325 may be copied into the workspace 215 and evaluated using a codelet 235. Further, the nodes in percept 325 could represent subject kinematics (i.e., the position and motion of an object classified as a car), a node in the neural network representing a parking event, and a node representing a parking space. Illustratively, the percept 325 is encoded as a matrix 350. The first row of the matrix 350 is used to indicate whether a given node is present in the percept 325. The remaining rows of the matrix 350 are used to present whether a directed link exists from one of the nodes (per row) to another one of the nodes (per column). For example, the second row encodes the links from A→B and A→C present in percept 325. Once encoded, the percept 325 may be stored as a new hard location 320. Illustratively, the percept is encoded as a hard location 320 in hard locations 305. Alternatively, the hard location 320 may be compressed using a run-length encoding scheme. In such a case, the matrix 350 could be encoded as the following vector <[(1,3)], [(0,1), (1,2)], [(0, 3)]>, where each bracketed set of numbered encodes a row of the matrix and each ordered pair represents a run of either a "1" or a "0" for the number of digits indicated in the pair.

In one embodiment, the hard location for a percept is created as a bit pattern generated by copying the values of the encoded matrix, in row order. Note, this approach allows the hard locations 305 to include each feature dimension in the encoded percept (i.e., each node and link between nodes in a percept). Further, as this is the first time the percept 325 (or any percept) has been stored in long-term memory 140, the matrix 350 is copied directly into the weight matrix 315 as entry 340. That is, like the hard location 320, the matrix 350 is copied to entry 340 in row order. Each entry in the weight matrix represents one of the feature dimensions for the memory. Subsequently, as similar memories (i.e., percepts that categorize to the same hard location 320 or are within a minimum distance to hard location 320) are stored in the long-term memory 140, the weights for each feature dimension in weight matrix 315 associated with hard location 320 are reinforced (positively or negatively).

Figure 3C:
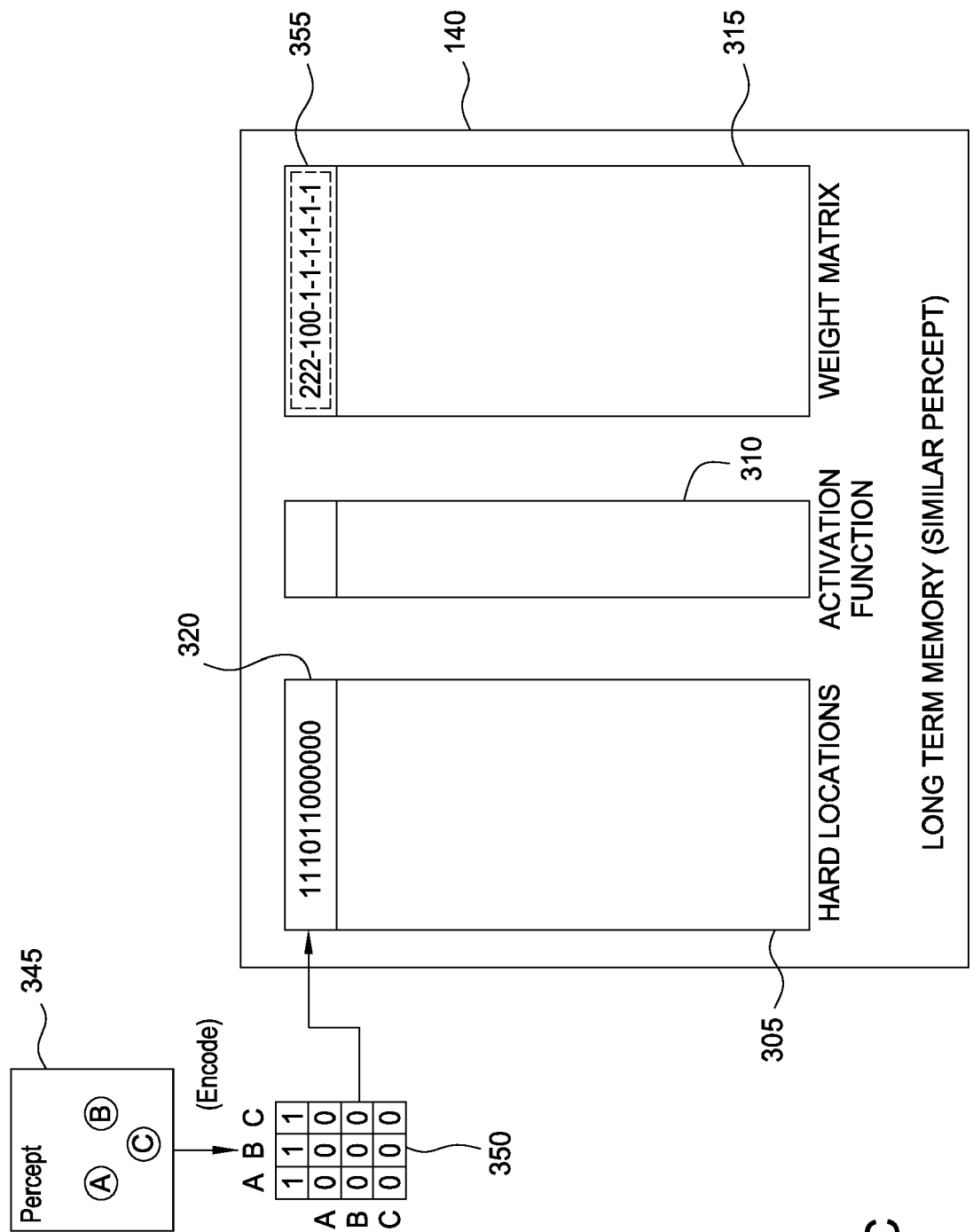

For example, FIG. 3C illustrates a second percept 345 being stored in the long-term memory 140, according to one embodiment of the invention. Illustratively, the percept 345 includes the same nodes "A," "B," and "C," as node 325, but lacks the links from node "A" to nodes "B" and "C." Thus, the percepts 345 and 325 share some, but not all feature dimensions in common. In this case, the hard locations 305 (e.g., an ART network) has decided to modify existing memories for an existing hard location. (e.g., by using a vigilance and choice function). The percept 345 is encoded in a matrix 350 using the same encoding scheme of matrix 350 of FIG. 3B. Note, in this example, the feature dimensions in percept 345 are the same as percept 325 (i.e., each includes nodes "A," "B," and "C,"), thus, the dimensionality of the hard locations 305 is unchanged by encoding this percept. Once the appropriate hard location is identified (in this example, hard location 320), the activation function 310 is used to activate one or more of the memories encoded in weight matrix 315. In one embodiment, the activation function 310 calculates a Hamming distance between the hard location and the encoded percept retrieve related experiences using one or more entries in the weight matrix 315. In an alternative embodiment, where the hard locations are implemented as an adaptive resonance theory (ART) network, the choice function and vigilance function may be determined directly from an ART network. Once identified, the weights of each feature dimension in an activated entry are adjusted. That is, the current encoded percept is used to reinforce (positively and negatively) the feature dimension values for one or more entries of the weight matrix 315. Illustratively, the percept, as encoded in matrix 350, is used to reinforce the weight matrix entry 340. In one embodiment, the reinforcement occurs by converting each "0" value in the encoded percept to a −1 and then adding each feature dimension the percept to the weights. Doing so results in a match between values in the encoded percept and the weights to increase a weight value. For example, a match between two "1" values reinforces that weight (resulting in weights with a grater positive magnitude) and match between two 0 values (after being converted to a −1 values) results in weights with a greater negative magnitude. Table I, below, illustrates the reinforcement for the weights corresponding to hard location 320 after encoded percept 350 is applied.

TABLE I

| Positive and Negative memory reinforcement | | | | | | | | | | | | |
|---|---|---|---|---|---|---|---|---|---|---|---|---|
| 1 | 1 | 1 | 0 | 1 | 1 | 0 | 0 | 0 | 0 | 0 | 0 | (weights as initially encoded from percept 325) |
| +1 | 1 | 1 | −1 | −1 | −1 | −1 | −1 | −1 | −1 | −1 | −1 | (percept 345 as applied to reinforce memory) |
| 2 | 2 | 2 | −1 | 0 | 0 | −1 | −1 | −1 | −1 | −1 | −1 | (resulting values for this memory in weight matrix 315) |

In one embodiment, the resulting values in weight matrix 315 may have a maximum magnitude. That is, the reinforcement (positive or negative) is cut-off after reaching a certain value. While such a cut-off may be tailored to suit the needs of a given case, a cut-off of +/−16 has proven to be an effective.

Figure 3D:
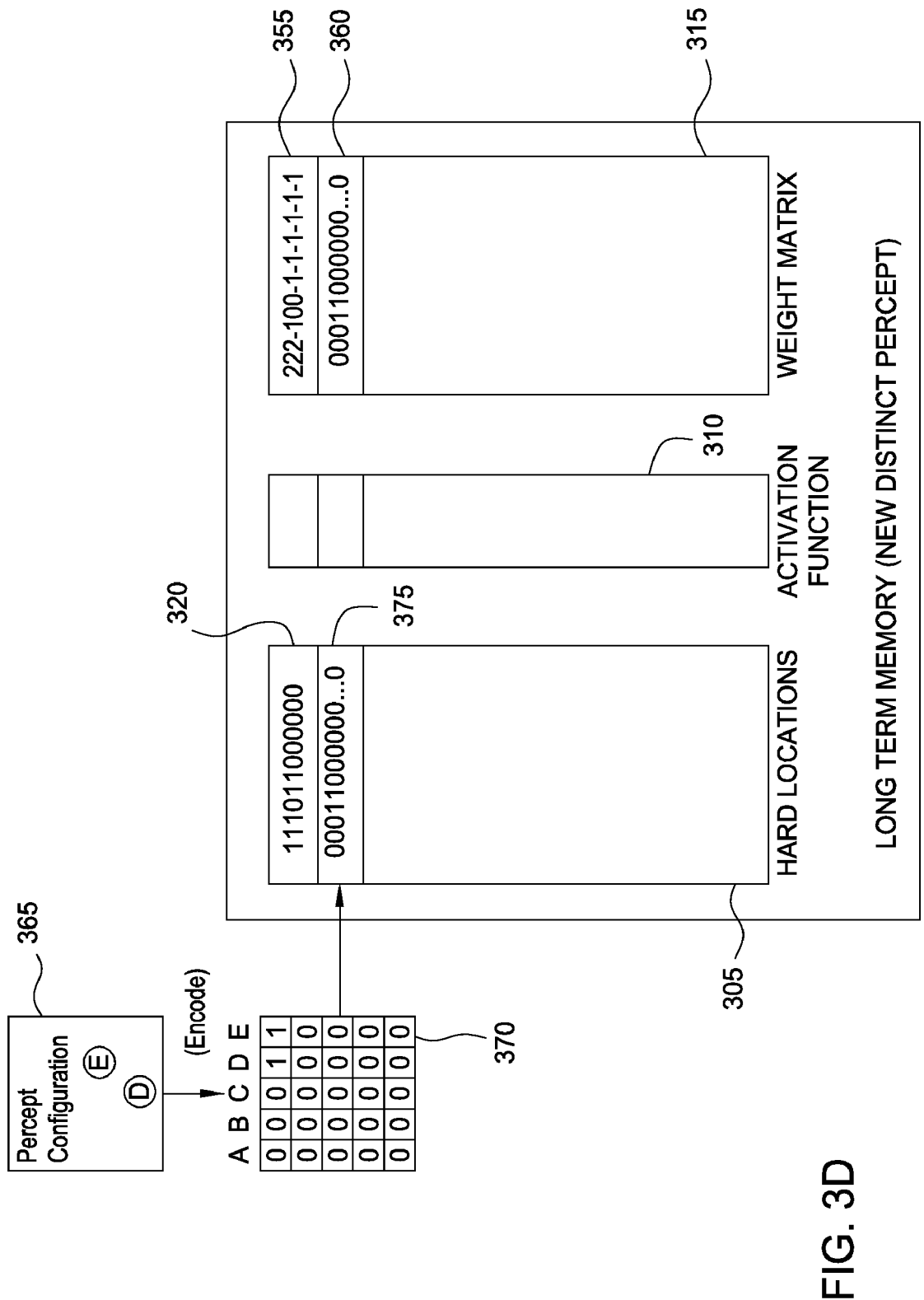

FIG. 3D illustrates a third percept 365 being stored in the long-term memory 140, according to one embodiment of the invention. Unlike the percept 345 of FIG. 3C, the percept 365 is dissimilar to percept 320 of FIG. 3A. For example, percept 365 does not include any of the nodes "A," "B," or "C," and includes nodes "D" and "E." That is, percept 365 includes different feature dimensions. Continuing with the example of a car parking, node "D" could represent a person appearing in the scene (e.g., when exiting a parked car) and node E could represent kinematics associated with the person. Because the encoded percept 365 represents a different general category of event from the encoded percepts 325 and 345, a new hard location 375 is used to represent this percept in hard locations 305. Note, matrix 370 now includes columns for the new nodes "D" and "E" not present in the matrices 330 and 350. Accordingly, the hard locations 305 grow to accommodate the nodes not present in the other encoded percepts (i.e., percepts 325 and 345). In one embodiment, this is determined by the ART network used to represent hard locations 320. Thus, this example embodiment illustrates how the hard locations 305 in the long-term memory 140 can grow gracefully as new events are observed by the computer vision engine 135, resulting in new nodes in the neural network of the perceptual memory 220 being encoded in the long-term memory 230. Additionally, an entry 360 in the weight matrix corresponding to node 375 is initialized using the values of matrix 370 encoding percept 365. Like the entry 340 used to initialize weight matrix for percept 325, entry 360 copies the values from the matrix 370, in row-order. Thereafter as other percept configurations are stored in long-term memory 140, the values in entry 360 of the weight matrix 315 are reinforced (either positively or negatively), up to the magnitude cutoff (e.g., +/−16).

Figure 4A:
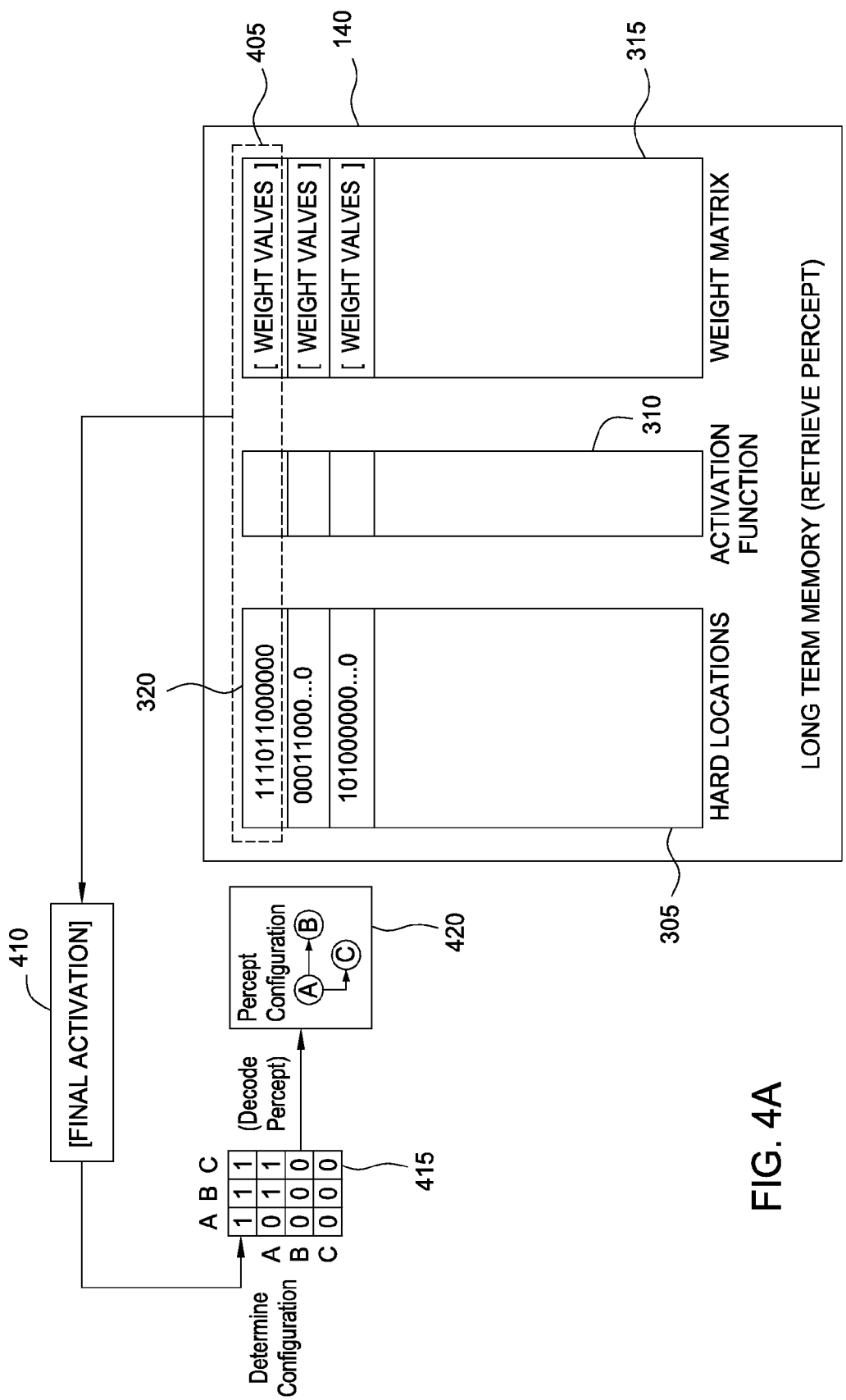
FIGS. 4A-4B illustrate encoded percepts retrieved from a long-term memory in response to an input stimulus, according to one embodiment of the invention.
Figure 4B:
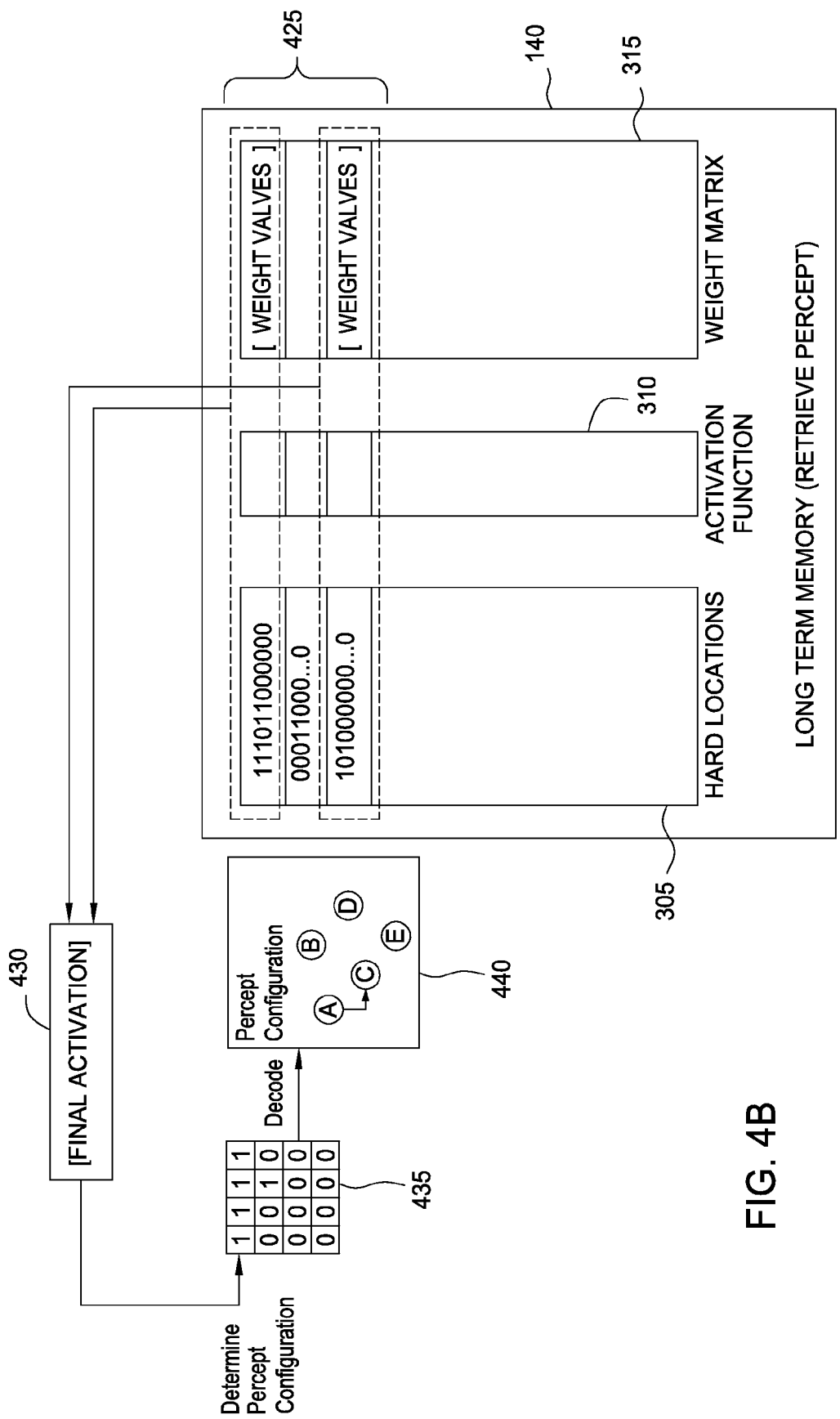

In addition to storing memories in long-term memory 140 (as encoded percepts), percepts may be retrieved from long-term memory. For example, one percept may be used to activate certain memories in the long-term memory 140, and the activated memories may themselves be used to construct a percept. For example, FIGS. 4A-4B illustrate percepts being retrieved from the long-term memory 140 in response to an input stimulus, according to one embodiment of the invention. The activation function 310 is used to select one or more hard locations 305 to activate. In this example, which hard locations 305 are activated is determined using a Hamming distance (i.e., using activation function 310). As is known, a Hamming distance specifies how distinct two input bit sequences are by counting the number of bit-wise differences between the inputs. By setting a Hamming distance threshold, only hard locations 305 with a Hamming distance below the threshold are activated. In one embodiment, this may be calculated from data was already stored in the hard locations 320. That is, only hard locations with a sufficient similarity to the input string are activated. Of course the threshold may be tailored to suit the needs of an individual case. Further, although illustrated using a Hamming distance, one of skill in the art will recognize that an ART distance measure calculated between the input to the ART network and the existing hard locations may also be used. In such a case, hard locations within a specified threshold of the input (as determined using the distance measure between the input and a given hard location) are activated.

Additionally, as shown in FIGS. 4A-4B, encoded percepts are stored in the long-term memory in a single pass, i.e., the results of the activation function is used to determine a final activation. However, one of ordinary skill in the art will recognize that this process may be performed recursively. For example, a first final activation returned for a first input may itself be supplied as a second input to the long-term memory, resulting in a second final activation itself also input to the long-term memory. This process may continue until a reaching a steady state and the resulting steady-state final activation may be returned as an activated memory responsive to the original input stimulus.

As shown in FIG. 4A, a single hard location is to be activated based on an input, specifically, the hard location enclosed by dashed lines 405. The selected location is copied as final activation 410. In one embodiment, the final activation 410 is determined using the weights corresponding to the hard locations activated by the input. As only one hard location 305 is activated in the example of FIG. 4A, the values for the corresponding weight matrix are used to generate an encoded matrix 415. In one embodiment, each positive weight value is converted to a "1" and each negative (or 0) value is converted to a 0 in encoded matrix 415. The encoded matrix is then decoded using the same encoding scheme used to encode percepts. That is, the matrix is then decoded to generate a percept returned as a response to a request to retrieve memories corresponding to an input percept. Illustratively, matrix 415 is decoded to create percept 420. Further, in the number of times a similar percept is observed by the long-term memory.

FIG. 4B shows a second example of a memory being retrieved from the long-term memory 140, according to one embodiment of the invention. Unlike the example of FIG. 4A, FIG. 4B shows multiple hard locations being activated and combined as a response to an input percept. Illustratively, hard locations 425 are to be activated based on an input. Thus, in this example assume that a Hamming distance determined for each of the hard locations 425 are within the Hamming distance threshold. Once the hard locations to activate have been identified, the corresponding weight matrix values are used to create final activation 430. In one embodiment, the final activation 430 may be determined by adding the weights associated with each activated hard location and converting the weights to an encoded percept matrix (i.e., matrix 435) using the same decoding scheme discussed above (converting each positive weight to a 1 and each negative (or zero) weight to a −1). By adding the weights from multiple hard locations 305, the resulting percept may capture and combine many different memories related to the input percept.

Figure 5:
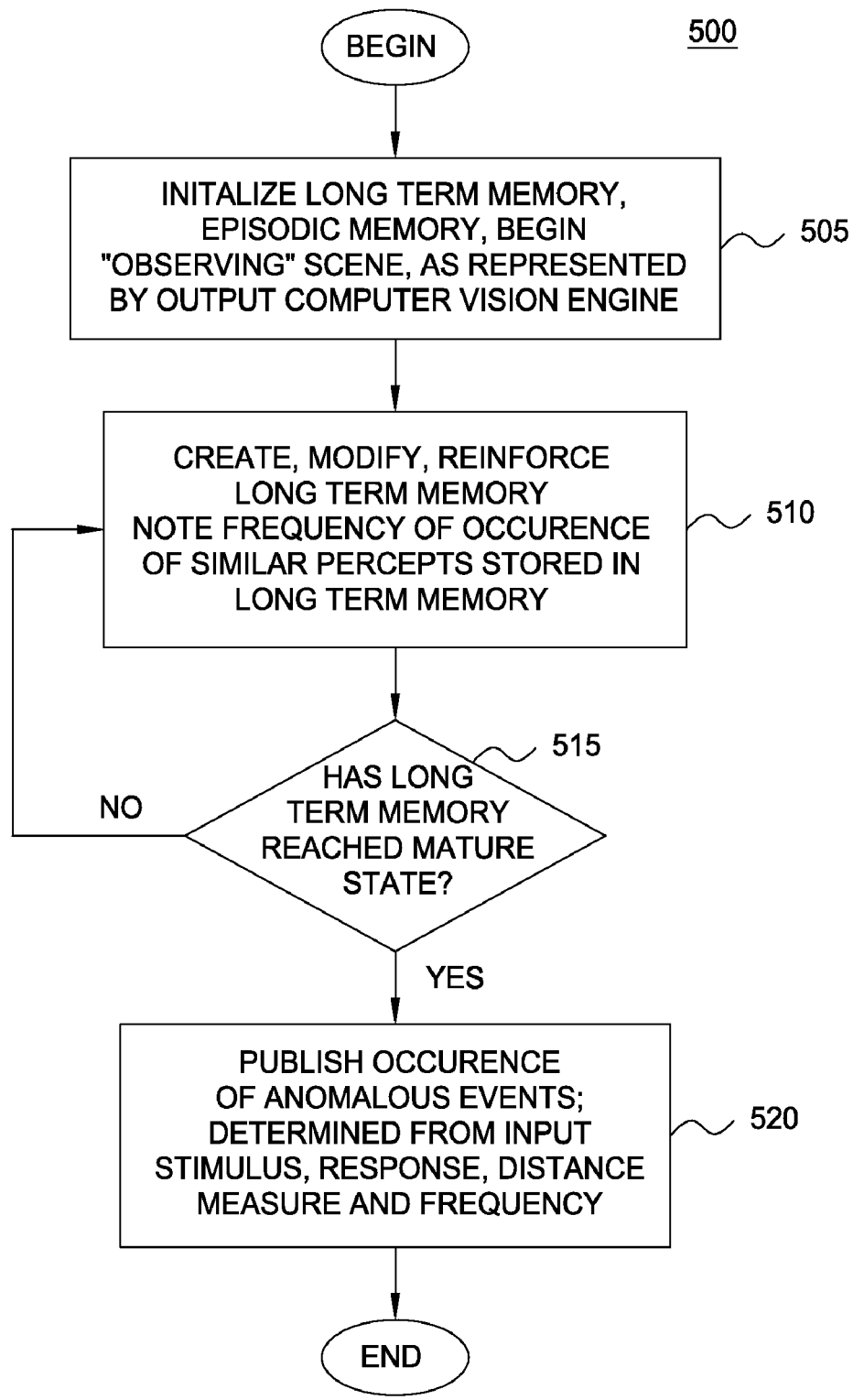
FIG. 5 illustrates a method for detecting anomalous events using a long-term memory in a video analysis system, according to one embodiment of the invention.

FIG. 5 illustrates a method 500 for detecting anomalous events using a long-term memory in a video analysis system, according to one embodiment of the invention. As shown, the method begins at step 505 where a machine learning engine initializes a long-term memory, e.g., an ART network and sparse distributed memory data structure as described above. Once initialized, the machine learning engine may begin receiving information from a computer vision engine. As described above, the information may include a semantic symbol stream and other information generated from a sequence of video frames.

At step 510, the machine learning engine creates, modifies, and reinforces memories stored in the long-term memory, as events detected by the primitive event detector (e.g., detector 212) are observed by the computer vision engine. For example, as described above, codelets may evaluate the results of stimulating the perceptual associative memory with a stream of primitive events. Further, as percepts are encoded and stored in the long-term memory, the frequency of occurrence with which similar percepts have been observed may be noted.

In one embodiment, the frequency of occurrence (F) for an active percept $F_x$ may be determined as the following ratio:

$$\frac{F_x}{F_{tot}}$$

Where $F_x$ represents the number of times a given percept has been stored in the long term memory and $F_{tot}$ represents the total number of percepts pushed into the long term memory At step 515, it is determined whether the long-term memory has reached a mature state. That is, it is determined whether the long-term memory has observed a scene for a sufficient period to determine whether subsequent events are anomalous or not. In one embodiment, as alerts are generated, they are scored based on the magnitude of distance measure d relative to a predefined scale (as specified in the long-term memory settings 222). For example, assume the distance measure provides a value between 0 and 1, like the three distance measure equations above. In such a case, the scale could score a given percept as being between 0 and 0.2 (no alert, not an anomalous event), 0.2. and 0.4 (a low alert), 0.4 and 0.6 (a medium alert), 0.6 and 0.8 (a high alert), and 0.8 and 1 (a very-high alert). Of course, other scales may be used. When the machine learning engine first begins observing a scene (through the output of the computer vision engine)

most (if not all) events are likely to be determined to be anomalous (i.e., have a distance measure corresponding to a "high" or "very-high" alert). Over time, as the number of percepts stored in the long-term memory grows, the machine learning engine begins to "see" the same event (or similar events, as encoded by the percepts) more than once. Accordingly, an event (as represented by a percept) that initially generates a high (or very high) alert, may subsequently result in a low (or no) alert—as both the frequency of occurrence (F) grows for that percept and the distance measure d falls for that percept.

In one embodiment, long-term memory is said to have reached a mature state when a "maturity ratio" falls below a specified threshold. In one embodiment, the maturity ratio may be determined as the ratio of very-high alerts or high alerts (or both) to the total number of alerts (or the total number of alerts and non-alerts combined). Further, the maturity ratio may be calculated at repeated intervals and alerts are published only when the maturity ratio indicates that the long-term memory is in a mature state. Doing so may be useful where the behavior in a scene changes dramatically at some point—leading to new events (and a large number of high-or very-high alerts to occur until the system cools down again. Of course, the exact scale thresholds may be tailored to suit the needs of an individual case and more (or fewer) gradations may be used.

At step 520, the machine learning engine may begin publishing notifications representing the occurrence of anomalous events, as represented by percepts, when such events occur. As described above, currently observed events (represented by active percepts in the workspace) may be used as an input stimulus to the long-term memory. The resulting response or "recall from memory" may be evaluated using both a frequency of occurrence related to the retrieved response and a distance measure to determine whether to classify the active percept as representing an anomalous event.

Figure 6:
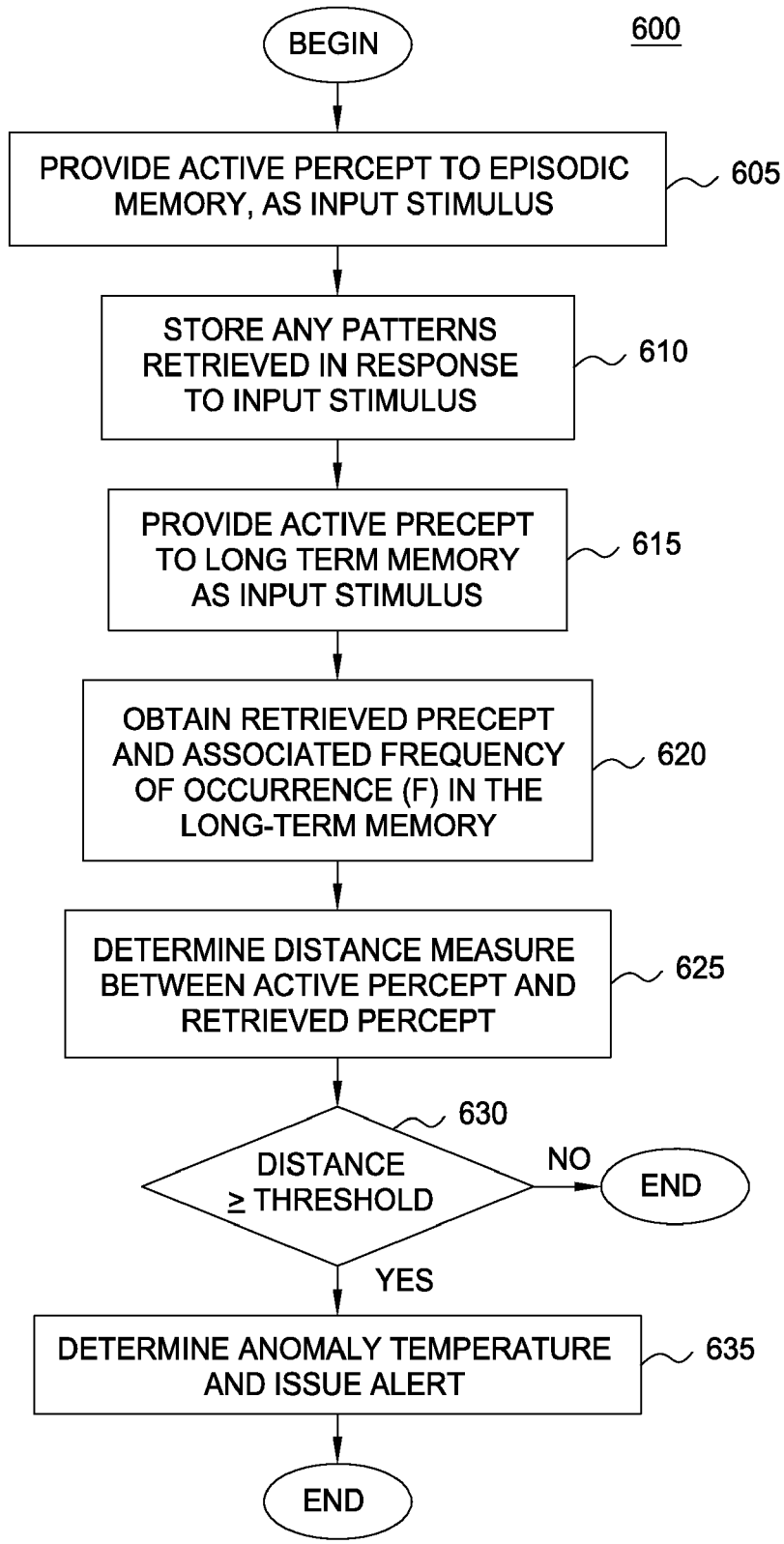
FIG. 6 further illustrates a method for detecting anomalous events using a long-term memory in a video analysis system, according to one embodiment of the invention.

FIG. 6 further illustrates a method 600 for detecting anomalous events using a long-term memory in a video analysis system, according to one embodiment of the invention. As described above, a perceptual associative memory may be excited using input from the from the computer vision engine, resulting in an active percept being copied to the workspace. In turn, such an active percept may be evaluated by an anomaly-detection codelet (one of codelets 235) to determine whether the active percept represents an anomalous event. As shown, the method 600 begins at step 605 where an active percept is provided to the episodic memory as an input stimulus. At step 610, if any percepts are retrieved from the episodic memory in response to the input stimulus, such percepts may be stored in the long-term memory (or used to reinforce existing memories in the long-term memory). Storing memories from the episodic memory in the long-term memory so allows the machine learning engine to earn the relevant behaviors in the scene, over time, as well as expand the knowledge stored in the long-term memory.

At step 615, the active percept is provided to the long-term memory as an input stimulus. And at 620, the response from the long-term memory is obtained. That is, at step 615 and 620, the most relevant knowledge, relative to the active percept, is retrieved from the long-term memory. For example, FIGS. 4A-4B illustrate examples of a percept being retrieved from a long-term memory structure constructed form an ART network and a sparse distributed memory structure. In one embodiment, the response may include percept constructed from one or more percepts encoded in the long-term memory as well as a frequency of occurrence (F) representing an occurrence frequency of the response percept retrieved from the long-term memory.

Once retrieved, the active percept is analyzed, relative to the percept retrieved from the long-term memory to determine whether the active percept represents the occurrence of an anomalous event. As shown in FIG. 6, at step 625, a distance between the active percept and the retrieved percept using the distance measure specified in the long-term memory settings. For example, any of Equation 1, 2, or 3 above (or other equation) may be used to determine a distance d between the active and retrieved percepts. By computing the distance between the active percept and the percept retrieved from the long-term memory, a measure of anomalousness of the active percept is determined. For example, as described above, the measure may provide a real-numbered value between 0 and 1 evaluated using a scale indicating a classification (e.g., low, medium, high) or a temperature (e.g., grey, magenta, blue, green, yellow, orange, red) to label a magnitude of how anomalous active percept is relative to the then current contents of the long-term memory. At step 630, if the distance measure exceeds a threshold specified by the long-term memory settings, then at step 635, an alert is generated. In one embodiment, the alert may include the active percept that resulted in the alert, as well as an anomaly temperature indicating a perceived measure of severity of the alert. Generally, the greater the result of the distance measure (and the smaller the frequency of occurrence (F)), the more probable the active percept represents the occurrence of an anomaly and the greater the anomaly temperature assigned to an alert.

Further, as the percept may represent a set of semantic nodes and relational links, the alert may decode the percept to provide a simple linguistic description of the pattern of behavior encoded by the percept. For example, assume that the video analysis and behavior-recognition system 100 is configured to observe traffic flow on an interstate freeway. In such a case, the computer vision engine may observe, track, and classify objects as vehicles. Further, over time the patterns encoded in the long-term memory would likely represent cars moving at high rates of speed through the field-of-vision defining the scene. In such a case, a percept encoding a pattern of "vehicle stops" or "person appears" would be determined to be anomalous, and result in an alert. More generally, what behaviors should be identified as anomalous is learned by the long-term memory through observing a scene, over time.

FIGS. 7A-7B illustrate examples of input percepts used to activate elements of a long-term memory as well as percepts returned in response, according to one embodiment of the invention. In the example of FIG. 7A, a stimulus 700 is used supplied to long-term memory, resulting in response 705 being returned. Illustratively, stimulus 700 and response 705 are shown as percepts. Thus, the percept of stimulus 700 includes nodes representing a sub-graph of a neural network exited by an input from a computer vision engine. Illustratively, response 705 includes fewer nodes than stimulus 700. This may occur as the stimulus 700 is generated by events input from the computer vision engine and includes nodes representing the detail of a current event being observed by the computer vision engine 135 (e.g., a percept stored in episodic memory) where the response 700 does not include some of the specific detail of the input stimulus (e.g., the node representing "parking space 16"). This allows a codelet to evaluate the stimulus representing the current event to identify patterns of events from the numerical data output by the computer vision engine.

Similarly, FIG. 7B illustrates a stimulus 710 and response 715. Illustratively, the stimulus 710 generates a response 715 that includes more nodes than the input. This may occur when one stimulus activates multiple hard locations in the long-term memory. For example, the actions represented by the nodes of stimulus 710 include "subject kinematics" a "person subject" and an event of "disappear." Assume that these actions are highly correlated in the long-term memory with the actions of a person entering a car and leaving a parking lot. In such a case, the input stimulus may activate hard locations related to parking, resulting in weight values for hard locations associated with a person disappearing to be combined with weight values for hard locations associated with vehicle behavior, resulting in a final activation returned in response to the input stimulus 715.

Advantageously, as described herein, embodiments of the invention provide a long-term memory used to store and retrieve information learned while a video analysis system observes a stream of video frames. The long-term memory provides a memory with a capacity that grows in size gracefully, as events are observed over time. Further, embodiments of the invention provide a long-term memory used to store and retrieve information learned while a video analysis system observes a stream of video frames depicting a given scene. Further, still the long-term memory may be configured to detect the occurrence of anomalous events, relative to observations of other events that have occurred in the scene over time. The long-term memory may publish the occurrence of an anomalous event for review by users of the system.

While the foregoing is directed to embodiments of the present invention, other and further embodiments of the invention may be devised without departing from the basic scope thereof, and the scope thereof is determined by the claims that follow.

What is claimed is:

1. A computer-implemented method for detecting anomalous events using a long-term memory in a video analysis system configured to observe patterns of behavior depicted in a sequence of video frames, comprising:
   receiving an active percept, wherein the active percept comprises a sub-graph of a neural network excited by a semantic symbol stream, wherein the semantic symbol stream describes objects depicted in the sequence of video frames;
   querying the long-term memory using the active percept as an input stimulus; receiving, in response to the querying, a retrieved percept from the long-term memory and an occurrence frequency (F) of the retrieved percept, wherein the retrieved percept encodes a pattern of behavior previously observed by the video analysis system;
   determining a distance (d) between the active percept and the retrieved percept; and
   upon determining the distance (d) exceeds a specified threshold, publishing an alert notification indicating the occurrence of an anomalous event, as represented by the active percept.

2. The method of claim 1, further comprising:
   querying an episodic memory using the active percept as an input stimulus, wherein the episodic memory stores percepts encoding instance specific details regarding events observed to have occurred in the sequence of video frames;
   receiving a response percept from the episodic memory; and
   storing the response percept in the long-term memory.

3. The method of claim 1, wherein the distance d is defined by:

$$d = 1 - [\alpha S + (1-\alpha)F]$$

wherein S is a cosine similarity determined between the active percept and the retrieved percept, wherein F is the occurrence frequency of the retrieved percept in the long-term memory, and wherein a is α heuristic weighting coefficient between 0 and 1.

4. The method of claim 1, wherein the distance d is defined by:

$$d = 1 - (S\sqrt{F} - \sqrt{1-S^2}\sqrt{1-F})^2$$

wherein S is a cosine similarity determined between the active percept and the retrieved percept, wherein F is the occurrence frequency of the retrieved percept in the long-term memory.

5. The method of claim 1, wherein the distance d is defined by:

$$d = 1 - \left[\frac{2}{1+e^{-\frac{S}{1-\sqrt{F}}}} - 1\right]$$

wherein $$\left[\frac{2}{1+e^{-\frac{S}{1-\sqrt{F}}}} - 1\right]$$

is a sigmoid curve and $$-\frac{S}{1-\sqrt{F}}$$

controls the curvature of the sigmoid curve, wherein e is Euler's constant, wherein S is a cosine similarity determined between the active percept and the retrieved percept, and wherein F is the occurrence frequency of the retrieved percept in the long-term memory.

6. The method of claim 1, wherein publishing the alert notification comprises:
   decoding the active percept to generate a semantic symbol stream corresponding to the active percept; and
   generating, from the semantic symbol stream, a linguistic description of a pattern of behavior represented by the semantic symbol stream.

7. The method of claim 1, wherein the long-term memory includes an adaptive resonance theory (ART) network and a sparse distributed memory.

8. The method of claim 1, wherein the long-term memory is configured to store a plurality of percepts, wherein each percept represents a pattern of behavior of observed to have occurred in a sequence of video frames.

9. The method of claim 8, wherein the retrieved percept is composed from two or more percepts retrieved in response to querying the long-term memory using the active percept as an input stimulus.

10. The method of claim 1, further comprising, prior to publishing the alert notification indicating the occurrence of the anomalous event, determining that the long-term memory is in a mature state.

11. A computer-readable storage medium containing a program which, when executed by a processor, performs an operation for detecting anomalous events using a long-term memory in a video analysis system configured to observe patterns of behavior depicted in a sequence of video frames, the operation comprising:
- receiving an active percept, wherein the active percept comprises a sub-graph of a neural network excited by a semantic symbol stream, wherein the semantic symbol stream describes objects depicted in the sequence of video frames;
- querying the long-term memory using the active percept as an input stimulus;
- receiving, in response to the querying, a retrieved percept from the long-term memory and an occurrence frequency (F) of the retrieved percept, wherein the retrieved percept encodes a pattern of behavior previously observed by the video analysis system;
- determining a distance (d) between the active percept and the retrieved percept; and
- upon determining the distance (d) exceeds a specified threshold, publishing an alert notification indicating the occurrence of an anomalous event, as represented by the active percept.

12. The computer-readable storage medium of claim 11, wherein the operation further comprises:
- querying an episodic memory using the active percept as an input stimulus, wherein the episodic memory stores percepts encoding instance specific details regarding events observed to have occurred in the sequence of video frames;
- receiving a response percept from the episodic memory; and
- storing the response percept in the long-term memory.

13. The computer-readable storage medium of claim 11, wherein the distance d is defined by:

$$d = 1 - [\alpha S + (1-\alpha) F]$$

wherein S is a cosine similarity determined between the active percept and the retrieved percept, wherein F is the occurrence frequency of the retrieved percept in the long-term memory, and wherein $\alpha$ is a heuristic weighting coefficient between 0 and 1.

14. The computer-readable storage medium of claim 11, wherein the distance d is defined by:

$$d = 1 - (S\sqrt{F} - \sqrt{1-S^2}\sqrt{1-F})^2$$

wherein S is a cosine similarity determined between the active percept and the retrieved percept, wherein F is the occurrence frequency of the retrieved percept in the long-term memory.

15. The computer-readable storage medium of claim 11, wherein the distance d is defined by:

$$d = 1 - \left[\frac{2}{1 + e^{-\frac{S}{1-\sqrt{F}}}} - 1\right]$$

wherein $$\left[\frac{2}{1 + e^{-\frac{S}{1-\sqrt{F}}}} - 1\right]$$

is a sigmoid curve and $$-\frac{S}{1-\sqrt{F}}$$

controls the curvature of the sigmoid curve, wherein e is Euler's constant, wherein S is a cosine similarity determined between the active percept and the retrieved percept, and wherein F is the occurrence frequency of the retrieved percept in the long-term memory.

16. The computer-readable storage medium of claim 11, wherein publishing the alert notification comprises:
- decoding the active percept to generate a semantic symbol stream corresponding to the active percept; and
- generating, from the semantic symbol stream, a linguistic description of a pattern of behavior represented by the semantic symbol stream.

17. The computer-readable storage medium of claim 11, wherein the long-term memory includes an adaptive resonance theory (ART) network and a sparse distributed memory.

18. The computer-readable storage medium of claim 11, wherein the long-term memory is configured to store a plurality of percepts, wherein each percept represents a pattern of behavior of observed to have occurred in a sequence of video frames.

19. The computer-readable storage medium of claim 18, wherein the retrieved percept is composed from two or more percepts retrieved in response to querying the long-term memory using the active percept as an input stimulus.

20. A system, comprising:
- a video input source configured to provide a sequence of video frames, each depicting a scene;
- a processor; and
- a memory containing a machine learning application which when executed by the processor is configured to perform an operation for detecting anomalous events using a long-term memory in a video analysis system configured to observe patterns of behavior depicted in a sequence of video frames, the operation comprising:
  - receiving an active percept, wherein the active percept comprises a sub-graph of a neural network excited by a semantic symbol stream, wherein the semantic symbol stream describes objects depicted in the sequence of video frames;
  - querying the long-term memory using the active percept as an input stimulus;
  - receiving, in response to the querying, a retrieved percept from the long-term memory and an occurrence frequency (F) of the retrieved percept, wherein the retrieved percept encodes a pattern of behavior previously observed by the video analysis system;
  - determining a distance (d) between the active percept and the retrieved percept; and
  - upon determining the distance (d) exceeds a specified threshold, publishing an alert notification indicating the occurrence of an anomalous event, as represented by the active percept.

21. The system of claim 20, wherein the operation further comprises:
- querying an episodic memory using the active percept as an input stimulus, wherein the episodic memory stores percepts encoding instance specific details regarding events observed to have occurred in the sequence of video frames;
- receiving a response percept from the episodic memory; and
- storing the response percept in the long-term memory.

22. The system of claim 20, wherein the distance d is defined by:

$$d=1-[\alpha S+(1-\alpha)F]$$

wherein, S is a cosine similarity determined between the active percept and the retrieved percept, wherein F is the occurrence frequency of the retrieved percept in the long-term memory, and wherein $\alpha$ is a heuristic weighting coefficient between 0 and 1.

23. The system of claim 20, wherein the distance d is defined by:

$$d=1-(S\sqrt{F}-\sqrt{1-S^2}\sqrt{1-F})^2$$

wherein, S is a cosine similarity determined between the active percept and the retrieved percept, wherein F is the occurrence frequency of the retrieved percept in the long-term memory.

24. The system of claim 20, wherein the distance d is defined by:

$$d = 1 - \left[\frac{2}{1+e^{-\frac{S}{1-\sqrt{F}}}} - 1\right]$$

wherein $$\left[\frac{2}{1+e^{-\frac{S}{1-\sqrt{F}}}} - 1\right]$$

is a sigmoid curve and $$-\frac{S}{1-\sqrt{F}}$$

controls the curvature of the sigmoid curve, wherein e is Euler's constant, wherein S is a cosine similarity determined between the active percept and the retrieved percept, and wherein F is the occurrence frequency of the retrieved percept in the long-term memory.

25. The system of claim 20, wherein publishing the alert notification comprises:

decoding the active percept to generate a semantic symbol stream corresponding to the active percept; and generating, from the semantic symbol stream, a linguistic description of a pattern of behavior represented by the semantic symbol stream.

* * * * *

UNITED STATES PATENT AND TRADEMARK OFFICE
CERTIFICATE OF CORRECTION

PATENT NO. : 8,126,833 B2  
APPLICATION NO. : 12/336354  
DATED : February 28, 2012  
INVENTOR(S) : Cobb et al.

Page 1 of 1

It is certified that error appears in the above-identified patent and that said Letters Patent is hereby corrected as shown below:

In the Claims:

Column 20, Claim 3, Line 8, please delete "a" and insert --$\alpha$-- therefor;

Column 20, Claim 3, Line 8, please delete "$\alpha$" and insert --a-- therefor.

Signed and Sealed this  
Nineteenth Day of June, 2012

David J. Kappos  
*Director of the United States Patent and Trademark Office*